(12) United States Patent
Saratovsky et al.

(10) Patent No.: US 10,197,272 B2
(45) Date of Patent: Feb. 5, 2019

(54) PROCESS AND APPARATUS FOR REDUCING ACID PLUME

(71) Applicant: Fuel Tech, Inc., Warrenville, IL (US)

(72) Inventors: Ian Saratovsky, Highland Park, IL (US); Scott K. Bohlen, Bucksport, ME (US); Chrisopher R. Smyrniotis, St. Charles, IL (US); Kent W. Schulz, Geneva, IL (US); Emelito P. Rivera, Inverness, IL (US)

(73) Assignee: FUEL TECH, INC., Warrenville, IL (US)

( * ) Notice: Subject to any disclaimer, the term of this patent is extended or adjusted under 35 U.S.C. 154(b) by 310 days.

(21) Appl. No.: 15/272,479

(22) Filed: Sep. 22, 2016

(65) Prior Publication Data
US 2017/0089572 A1    Mar. 30, 2017

Related U.S. Application Data

(60) Provisional application No. 62/232,478, filed on Sep. 25, 2015.

(51) Int. Cl.
*F23J 15/00* (2006.01)
*B01D 53/86* (2006.01)
(Continued)

(52) U.S. Cl.
CPC .......... *F23J 15/003* (2013.01); *B01D 53/502* (2013.01); *B01D 53/8609* (2013.01); *B01D 53/8628* (2013.01); *F23J 7/00* (2013.01); *F23J 15/04* (2013.01); *B01D 53/64* (2013.01); *B01D 53/8631* (2013.01); *B01D 2251/402* (2013.01); *B01D 2255/2047* (2013.01);
(Continued)

(58) Field of Classification Search
CPC .... F23J 15/003; F23J 7/00; F23J 15/04; F23J 2219/10; F23J 2219/50; F23J 2900/15004; B01D 53/502; B01D 53/8609; B01D 53/64; B01D 53/8632; B01D 2251/402; B01D 2255/2047; B01D 2257/404; B01D 2257/602; B01D 2258/0283
USPC ....................................................... 110/345
See application file for complete search history.

(56) References Cited

U.S. PATENT DOCUMENTS

| 4,248,617 A * | 2/1981 | Kamo | ................... C05B 1/04 71/42 |
| 6,334,895 B1 * | 1/2002 | Bland | ................. C04B 18/021 106/705 |

(Continued)

FOREIGN PATENT DOCUMENTS

WO    WO 2017053499 A1 *    3/2017    ......... B01D 53/8609

*Primary Examiner* — Stephen M Gravini
(74) *Attorney, Agent, or Firm* — Thaddius J. Carvis

(57) ABSTRACT

The description relates to a process for reducing acid plume from stacks from coal-fired combustors operating at varying loads, which have typically been treated by back-end calcium carbonate (limestone) which has not been able to effectively control visible acid plume as power is ramped up from low load. According to the process, as high sulfur and high iron coals are burned in a combustor, magnesium hydroxide slurry is introduced into hot combustion gases in or near the combustion zone. And, during ramp up to high load from a period of operation at low load, additional magnesium hydroxide is introduced into an intermediate-temperature zone.

6 Claims, 1 Drawing Sheet

(51) Int. Cl.
*F23J 7/00* (2006.01)
*F23J 15/04* (2006.01)
*B01D 53/50* (2006.01)
*B01D 53/64* (2006.01)

(52) U.S. Cl.
CPC .. *B01D 2257/302* (2013.01); *B01D 2257/404* (2013.01); *B01D 2257/602* (2013.01); *B01D 2258/0283* (2013.01); *F23J 2219/10* (2013.01); *F23J 2219/50* (2013.01); *F23J 2900/15004* (2013.01)

(56) References Cited

U.S. PATENT DOCUMENTS

| | | | |
|---|---|---|---|
| 7,771,683 B2 * | 8/2010 | Hurley | B01D 53/60 423/210 |
| 9,541,288 B2 * | 1/2017 | Pastore | C10L 10/04 |
| 9,957,454 B2 * | 5/2018 | Morris | C10L 5/32 |
| 2005/0244319 A1 * | 11/2005 | Hurley | B01D 53/60 423/212 |
| 2009/0071067 A1 * | 3/2009 | MacPherson | C10L 9/10 44/601 |
| 2011/0092617 A1 * | 4/2011 | Kensicher | B01D 53/1493 524/2 |
| 2011/0269079 A1 * | 11/2011 | Wolferseder | F23J 7/00 431/4 |
| 2012/0006239 A1 * | 1/2012 | Nowak | F23D 1/00 110/342 |
| 2012/0204773 A1 * | 8/2012 | Pastore | C10L 10/04 110/342 |
| 2017/0089572 A1 * | 3/2017 | Saratovsky | B01D 53/8609 |
| 2018/0029006 A1 * | 2/2018 | Li | B01J 20/02 |

* cited by examiner

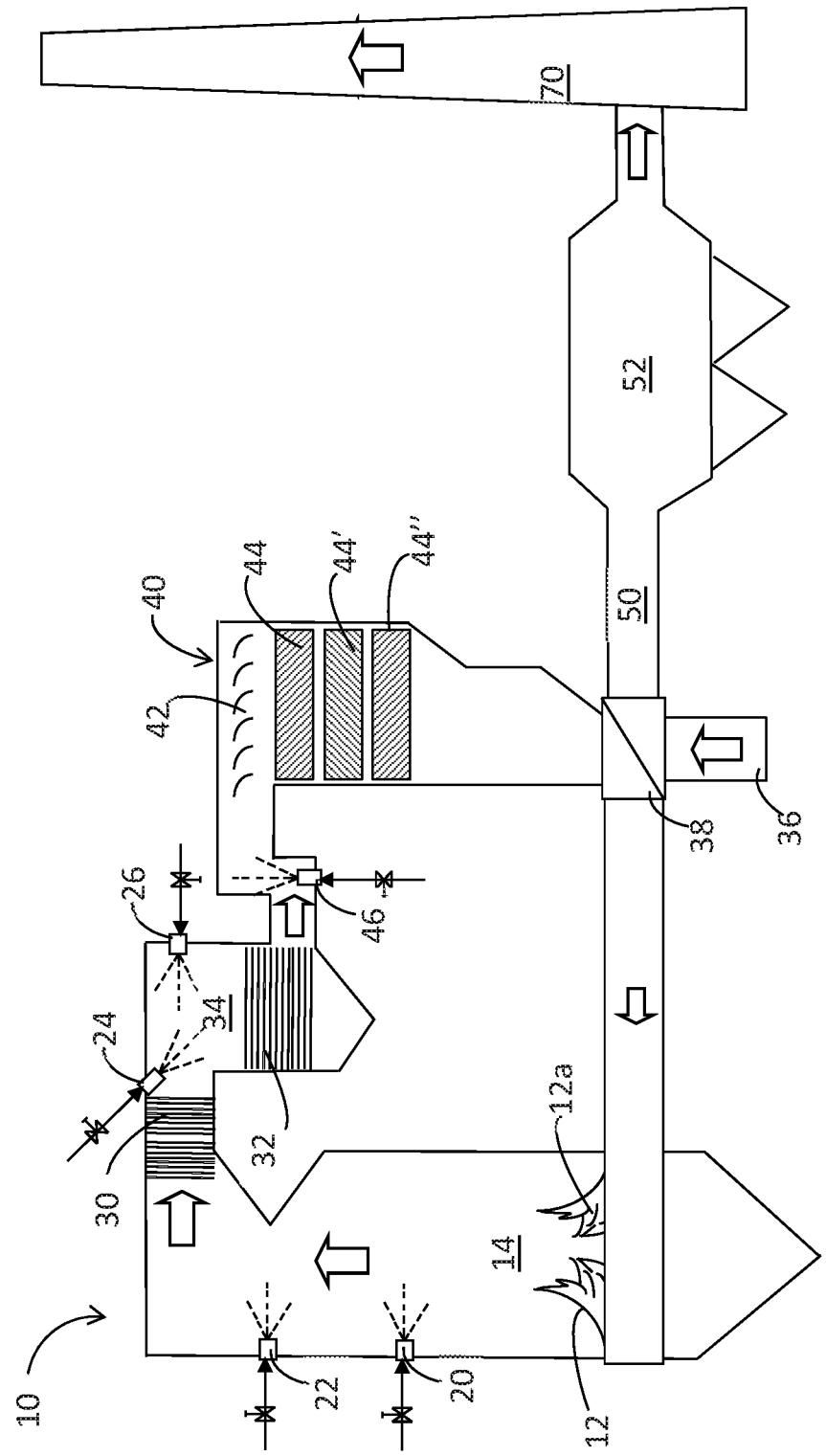

PROCESS AND APPARATUS FOR REDUCING ACID PLUME

PRIORITY CLAIM TO PRIOR APPLICATION

This application is a continuation-in-part of prior U.S. Provisional Application No. 62/232,478, filed Sep. 25, 2015, entitled "Process and Apparatus for Reducing Acid Plume", the disclosure of which is incorporated by reference herein in its entirety.

FIELD OF THE INVENTION

The invention relates to a process and an apparatus for reducing acid plume from stacks from coal-fired combustors operating at varying loads, which have typically been treated by back-end calcium carbonate (limestone) which has not been able to effectively control visible acid plume as power is ramped up from low load.

BACKGROUND OF THE INVENTION

The discharge of acid plume, especially visible acid plume, is caused by sulfur trioxide ($SO_3$), which in turn is caused by the oxidation of sulfur dioxide ($SO_2$). The problem is especially troublesome for coal-fired combustors burning coals having high sulfur contents and is exacerbated when the coal contains high levels of iron, which is involved in corrosion and can result in an increased production of $SO_3$.

The formation of sulfuric acid in boilers typically occurs when sulfur in a fuel is oxidized. Almost all of the sulfur is oxidized to $SO_2$ in the combustion zone because, at combustion temperatures, $SO_2$ is the equilibrium form of oxidized sulfur. As the gas temperature falls between the combustion zone and the stack plume, equilibria shifts occur. While $SO_2$ is the most stable species in the combustion zone, a small percent of $SO_2$ in the gas, e.g., from about ½ to about 2%, converts to $SO_3$ as temperatures drop below 1,400° F. $SO_3$ levels increase across the selective catalytic reduction chamber (SCR), if present, and concentrations remain stable in the gas. At around 800° F. some of the $SO_3$ converts to sulfuric acid ($H_2SO_4$) in the presence of water vapor in the gas. This shift of $SO_3$ to $H_2SO_4$ in the combustion gas continues until almost all of the $SO_3$ is converted to $H_2SO_4$ by 600 degrees F. The rest of the $SO_3$ is converted by the time the gas exits air preheater. Additional kinetic factors influencing oxidation of $SO_2$ include the fuel sulfur content, excess combustion air levels and catalytic oxidation associated with some metals in the ash and on the boiler tube surfaces, especially iron and vanadium.

The use of catalytic units to reduce $NO_x$ in the combustion gases have also been seen to increase $SO_3$ because the catalyst employed to reduce $NO_x$ with a nitrogenous reducing agent has the tendency to oxidize $SO_2$ to $SO_3$. This oxidation tendency is thought to increase as the $NO_x$ reducing capability is lost as the catalyst degrades due to the normal aging process.

Some, but not all, coal-fired combustors will include a wet flue gas desulfurizing unit (FGD). Wet FGD systems tend to reduce $SO_3$ levels, but they also typically convert $SO_3$ to sulfuric acid ($H_2SO_4$) mist. While there is no general rule, $SO_3$ reduction can be in the range of about 30% to about 40%; however, scrubbers are not effective at removing sulfuric acid aerosols, and most of the sulfuric acid mist slips past the scrubber and exits the stack, often visible as a blue plume.

While the art has proposed many solutions to the problem of plume, none have been fully effective 100% of the time. Among the approaches that have been considered are: alkali injection into the furnace, humidification at an ESP inlet to reduce the temperature to below the acid dew point, alkali injection combined with humidification at the ESP inlet, a separate wet particulate control device such as a wet ESP, alkali injection in ducting leading to a wet FGD scrubber and an electrostatically augmented mist eliminator. However, sometimes load fluctuations cause $SO_3$ problems beyond the ability of a particular technology to meet increased acid plume and anomalies occur that have not been fully addressed.

In one particular scenario, a serious problem relates to burning a high-sulfur coal, also having a high iron content, in a combustor outfitted with a selective catalytic reduction unit for $NO_x$ control and utilizing magnesium hydroxide injection into the furnace for control of slag, corrosion and fouling. Due to the chemistry involved, the magnesium hydroxide injected in this manner has been successful in controlling blue plume as well as slag, corrosion and fouling under most circumstances; however, when load is shifted up and down, the visible blue plume cannot be fully handled at all times.

Whether or not an FGD is employed, visible blue plume is a continuing problem and is a consequence of $SO_3$ concentrations in the stack gas emissions being over 5 to 15 ppm.

There is a need to better control visible blue plume, especially under conditions of fluctuating load.

SUMMARY OF THE INVENTION

The present invention provides a method of controlling the visible blue plume during low load, ramp and high load.

In embodiments, the process for reducing acid plume from stacks discharging the combustion gases produced by burning a coal having high sulfur and high iron contents, comprises: in a combustion zone, burning coal having from 1.0 to 8.0% sulfur and from 6.5 to 30.0% iron, producing combustion gases containing sulfur dioxide and sulfur trioxide; introducing a slurry of magnesium hydroxide into the combustion gases in or directly downstream of the combustion zone; responsive one or more control signals during an increase in the rate of burning coal from a low load to a higher load, introducing a slurry of magnesium hydroxide into the combustion gases in an intermediate-temperature zone; and following reaching steady state operation at the higher load, stopping introduction of the magnesium hydroxide into the intermediate-temperature zone.

In embodiments, the process includes passing the combustion gases through a highly oxidizing catalyst for the selective catalytic reduction of NOx with a nitrogenous treatment chemical while oxidizing molecular mercury in the gases.

Other preferred aspects, including preferred conditions and equipment and their advantages, are set out in the description which follows.

BRIEF DESCRIPTION OF THE DRAWINGS

The invention will be better understood and its advantages will become more apparent when the following detailed description is read in conjunction with the accompanying drawings, in which:

FIG. 1 is a flow diagram of one embodiment of the invention involving a combustor utilizing by selective catalytic reduction to reduce the discharge of $NO_x$.

DETAILED DESCRIPTION OF THE INVENTION

The present invention provides processes and apparatus that will have a very positive impact on air quality by enabling coal-fired combustors, especially those burning coal high in iron, to operate more efficiently while reducing acid plume above the stack used to discharge the combustion gases. The problem of acid plume, especially visible blue plume, is especially troublesome where the combustor is operated at varying output levels over the course of a day and the combustion gases are treated by selective catalytic reduction to reduce the discharge of $NO_x$.

Reference is first made to FIG. 1, which is a flow diagram of one embodiment of the invention, which specifically applies to coal-fired combustors, such as coal-fired boilers used for hot water and steam production. FIG. 1 shows a large combustor 10. Coal is fed to burners 12 and 12a and burned with air in a combustion zone 14.

It has been found in our testing that $SO_3$ collects in the furnace as sulfuric acid under low load conditions and that as the furnace becomes hotter during ramp up from low load, this stored $SO_3$ is vaporized at levels that can cause downstream corrosion and/or acid plume. But, according to the invention, the introduction of magnesium hydroxide in an intermediate temperature range is initiated and run for brief periods until the excess $SO_3$ is neutralized. The problem is particularly pronounced when load is held to 65-75% of full load for more than 12 hours and is then increased to at least 75-85% of lull load. Under these and other conditions, $SO_3$ is produced but apparently lost in the system until the combustor temperatures become high enough to vaporize it. At that point and until the $SO_3$ (likely present as sulfuric acid) is fully vaporized, magnesium hydroxide must be introduced into the intermediate-temperature zone. Simply increasing introduction into the combustion zone will not be effective. This discovery was unexpected.

It is an advantage of the invention that coal that is high in iron (e.g., iron contents of greater than about 15%, e.g., from about 20 to 35%, based on the weight of the ash and expressed as $Fe_2O_3$) and/or calcium content (e.g., calcium contents of greater than 5%, e.g., from about 10 to 25%, based on the weight of the ash and expressed as CaO). It is also an advantage of the invention that slag can be effectively controlled even for coals having significant sulfur contents, e.g., above about 1% and in the range of from about 3 to about 5%.

Hot combustion gases flow through the upper portion of combustor 10 as indicated by the block arrows, then flow past heat exchangers, e.g., 30 and 32, which transfer heat from the combustion gases to water or steam for the generation of steam or super-heated steam. Other configurations may also be employed as dictated by the design of a particular boiler, but it is typical that the heat exchangers 32 function as an economizer and are horizontally disposed in a descending section of duct work. Air for combustion, supplied by line 36, is typically preheated as noted by gas-to-gas heat exchanger 38 which transfers heat from ductwork at the exit end of the combustion equipment, e.g., downstream of heat exchange sections 30 and 32, where useful thermal energy is recovered from the combustor. Between heat exchange sections 30 and 32 is a space 34 free of heat exchange equipment, which will be discussed below as an intermediate-temperature zone.

Following heat exchangers 30 and 32 the combustion gases may be passed into a selective catalytic reduction (SCR) reactor 40 wherein $NO_x$ created during combustion can be treated with ammonia or gasified urea (typically comprising ammonia and HNCO), which can be supplied by one or more injectors 46 or the like, to convert the $NO_x$ to nitrogen and water. The combustion gases flowing to reactor 40 are typically turned by vanes 42 to pass through a series of catalyst layers, here 44, 44' and 44". Alternatively, many installations will benefit from selective non catalytic reduction (SNCR) using urea alone at higher temperatures, e.g., as taught by Epperly, et al., in U.S. Pat. No. 5,057,293, without requiring the reactor 40.

Following SCR reactor 40, the combustion gases will flow through an air-to-air heat exchanger 38. The combustion gases leaving the heat exchanger 38 are cooled significantly by the time they are passed through duct work 50 to a particulate recovery device 52, which can be electrostatic precipitator (ESP), baghouse or other like suitable device. Particulate recovery device 52 collects particulates prior to discharge to a stack, such as shown as 70. This is a highly-generalized version of actual industrial or utility combustor configurations and effluent treatment processes, but illustrates a workable scheme. The temperature of the gases leading to the SCR reactor will be at a temperature suitable for the SCR reaction, e.g., a temperature within the range of from about 500° to about 1000° F. And, the temperature following the SCR and prior to the particulate recovery device 52, e.g., in lines 50, will typically be within the range of below about 1000° F., e.g., sometimes as low as about 250° F. Of course, not all embodiments will include a SCR unit, and these embodiments will generally encounter the same temperatures upstream of the particulate recovery device 32. In order to control acid plume, the prior art has introduced limestone, lime, and/or hydrated lime in this general area, but results have been mixed, costly and difficult to apply.

To control acid plume according to the invention, magnesium hydroxide is available for introduction in at least two locations: in the furnace and at a mid-temperature range where the chemical kinetics and thermodynamics are more favorable to $SO_3$. In all cases, a slurry of magnesium hydroxide is introduced into the combustion gases in or directly downstream of the combustion zone 14. Each of the injector locations will typically employ a plurality of nozzles, e.g., in arrays 20, 22, 24 and 26, strategically positioned across the cross section at the designated locations to achieve essentially full cross sectional coverage.

The $SO_3$ content of the gases can be continuously monitored at strategic locations, including the stack, and near or just upstream of injectors. Based on receiving signals representative of $SO_3$ concentrations (or $SO_2$ concentrations with a calculated $SO_2$ to $SO_3$ conversion rate), a controller, not shown, can provide control signals to injectors as needed to adjust the rate of introduction of magnesium hydroxide. A monitor for $SO_3$ can be positioned before and/or after an introduction zone to determine the effectiveness of the treatment. Monitors following the zone can be positioned far enough downstream of the zone to assure time for essentially complete reaction between the pollutant and the magnesium oxide reagent.

In addition to feedback control, or in the alternative, a feed forward control can be utilized to control introduction of magnesium hydroxide in direct relation to coal feed, temperature at a designated location and/or other parameter.

It is an advantage and surprising finding of the invention that injectors in the furnace optimized for slag/fouling control also effectively controls plume and slag under most conditions but must be supplemented by magnesium hydroxide introduction into intermediate temperature gases when the combustor is ramped up from low load.

Following reaching steady state operation at a higher load, the introduction of the magnesium hydroxide into the intermediate-temperature zone 34 is stopped. The time of stopping can be determined by feed forward control or feedback based on one or more measured parameters, such as concentration of $SO_3$ at the stack 70.

In the furnace, magnesium hydroxide decomposes to magnesium oxide, which reacts with ash to modify ash fusion temperature and it captures $SO_3$. In the intermediate-temperature zone, magnesium hydroxide injection improves $SO_3$ control and still provides slag and fouling control at the horizontal superheaters, reheaters, economizers, SCR sections and air heaters. It is an advantage of the invention that while effective for its main purposes, magnesium hydroxide does not react with fly ash at temperatures less than 2000° F. Moreover, because the magnesium hydroxide is not sintered to a large extent, there is more available surface area for $SO_3$ and subsequent chemical reactions between magnesium oxide (MgO) and $SO_3$.

The most effective distribution of the fine particles will depend on modeling to determine proper placement of injectors and adjustment of droplet size, momentum and concentration of the magnesium hydroxide slurry. The locations for the nozzles can be determined by computational fluid dynamics, by methodologies taught for example in U.S. Pat. Nos. 5,740,745 and 5,894,806, which are hereby incorporated by reference. It is an advantage of the invention that when slurries are injected as described, it is possible to achieve full coverage with magnesium hydroxide across a three-dimensional section of a passage for the gases to be treated, providing 70 to 100% coverage, e.g., 80%, at the temperature necessary for reaction.

Control of $SO_3$ is effective under most circumstances by introducing magnesium hydroxide as an aqueous slurry into the combustion gases in the furnace, e.g., at locations 20 and/or 22 where the temperature is within the range of from about 2000 to about 2800° F. and conditions are favorable to $SO_3$ formation. The invention shows a strong advantage by injecting again in the intermediate-temperature zone, e.g., downstream of heat exchangers 30 but ahead of heat exchangers 32. This section of ductwork between the heat exchanger sections 30 and 32 typically provides an open space with good opportunity for the magnesium hydroxide to mix well with the combustion gases. The area 34 between these heat exchange sections 30 and 32 is herein referred to as the "intermediate-temperature zone" and is highly suitable for injection, e.g., by one or more injectors 26 due to its open character. The temperature in the intermediate-temperature zone will be less than 2000° F., and preferably less than 1800° F., and typically above 600° F. In embodiments, injection into the intermediate-temperature zone is highly effective during periods of ramp up at temperatures between about 650 and 800° F. This temperature range is optimal for reducing $SO_3$ especially where the area 34 is large enough to provide residence times of several seconds, e.g., from 2 to 10 seconds, and desirably over 5 seconds.

The sorbent slurry is typically characterized as containing from about 58 to about 62% magnesium hydroxide, preferably brine-precipitated, solids by weight in water. Suitable stabilizers can be used to avoid the need for constantly stirring the tanks, but stirring is preferably provided. The material is further characterized by having a mass average particle size of from about 0.3 to about 12.0 microns ($\mu$), e.g., nominally about 1.5 to 3.0 microns. Nozzles selected for introducing a slurry of magnesium hydroxide into the gases are able to introduce the slurry as fine droplets having a $D_{50}$ of less than 50 microns, the magnesium hydroxide being introduced in amounts sufficient to reduce the concentration of sulfur trioxide to less than 10 ppm. Given the fine droplets, good mixing and significant residence times at optimum temperature, $SO_3$ control according to the invention is surprisingly good. Doses of magnesium hydroxide in the furnace will typically be within the range of from 1.5 to 3.0 pounds per ton of fuel expended during combustion. In the intermediate temperature zone, doses of magnesium hydroxide in the furnace will typically be within the range of from 1.5 to 20 pounds per ton of fuel expended during combustion.

In embodiments, the magnesium hydroxide is introduced in amounts sufficient to reduce the concentration of sulfur trioxide in the stack to less than 10 ppm.

An additional advantage of the invention is that the process does not adversely affect the operation of an SCR unit. It is an advantage that where an SCR catalyst might be found to increase $SO_3$ oxidation, that problem is effectively addressed by the invention without adversely affecting the capability of a mercury sorbent to be introduced downstream of the catalyst where the mercury sorbent can take advantage of the catalysts effectiveness in oxidizing metallic mercury to enhance its absorption.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for reducing acid plume from stacks discharging combustion gases produced by burning a coal having high sulfur and high iron contents, comprising:
   a. in a combustion zone, burning coal having from 1.0 to 8.0% sulfur and from 6.5 to 30.0% iron, producing combustion gases containing sulfur dioxide and sulfur trioxide;
   b. introducing a slurry of magnesium hydroxide into the combustion gases in or directly downstream of the combustion zone;
   c. responsive one or more control signals during an increase in burning coal from a low load to a higher load, introducing a slurry of magnesium hydroxide into the combustion gases in an intermediate-temperature zone; and
   d. following reaching steady state operation at the higher load, stopping introduction of the magnesium hydroxide into the intermediate-temperature zone.

2. The process of claim 1, further including:
   passing the combustion gases through a highly oxidizing catalyst for selective catalytic reduction of $NO_x$ with a nitrogenous treatment chemical while oxidizing molecular mercury in the gases.

3. The process of claim 1, wherein the magnesium hydroxide slurry is introduced into the intermediate-temperature zone which is a horizontal section of duct without heat exchanges oriented between an array of vertical heat exchange tubes and an array of horizontal heat exchange tubes at a temperature of less than 2000° F.

4. The process of claim 3, wherein the temperature in the intermediate-temperature zone is within a range of from 650 to about 800° F.

5. The process of claim 1, wherein the slurry of magnesium hydroxide is introduced as fine droplets having a $D_{50}$ of less than 50 microns.

6. The process of claim 1, wherein the magnesium hydroxide is introduced in amounts sufficient to reduce concentration of sulfur dioxide in combustion gases to less than 10 ppm.

* * * * *